Oct. 23, 1951     S. B. HENDRICKSON     2,572,145
CUSHIONED AND HINGED SEAT STRUCTURE
Filed July 31, 1948     2 SHEETS—SHEET 1
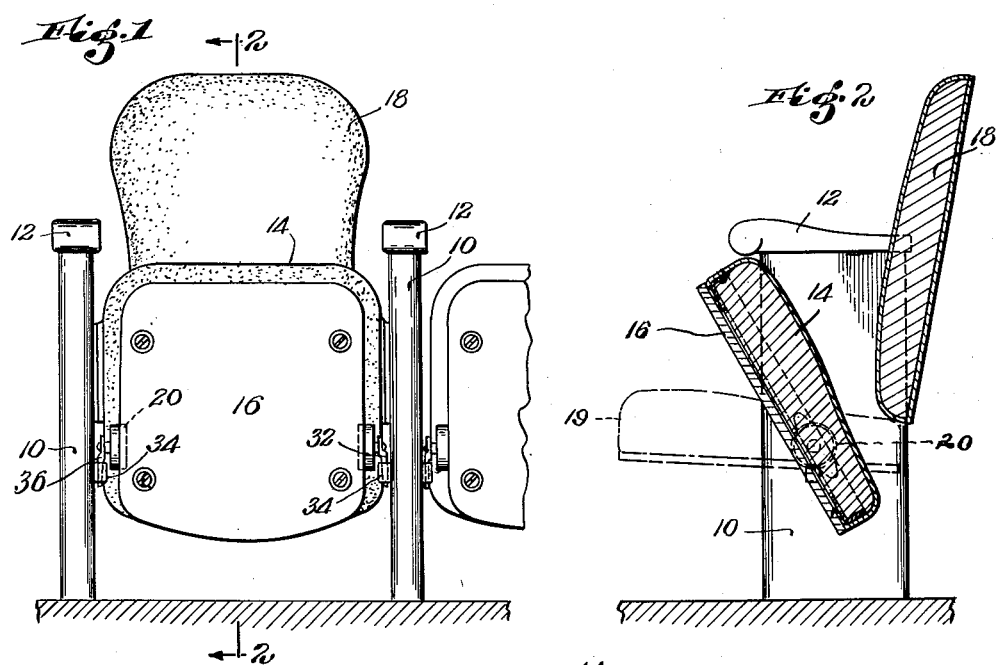
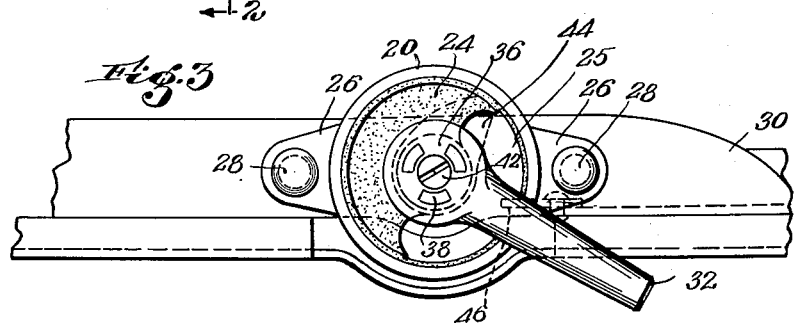
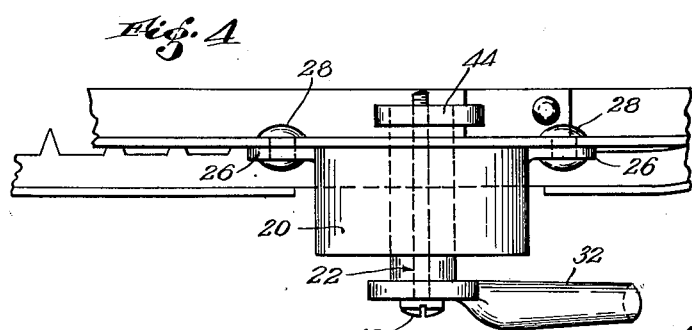
INVENTOR.

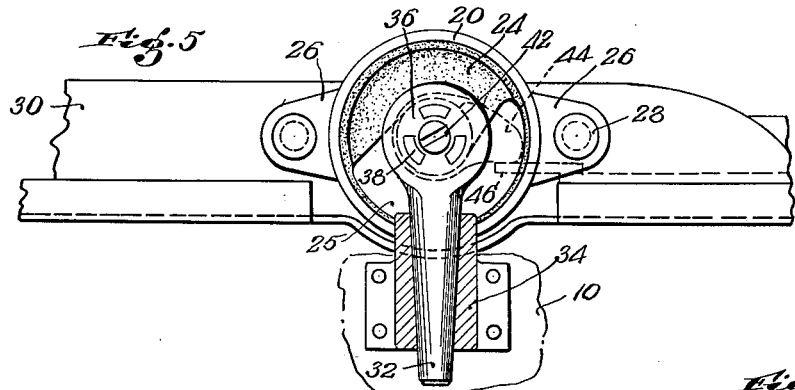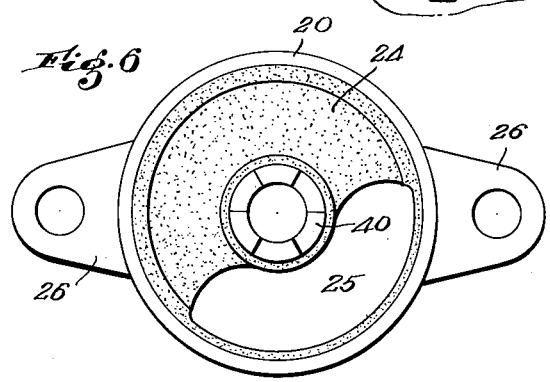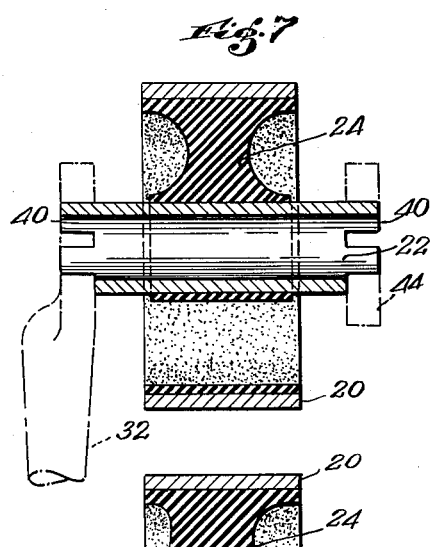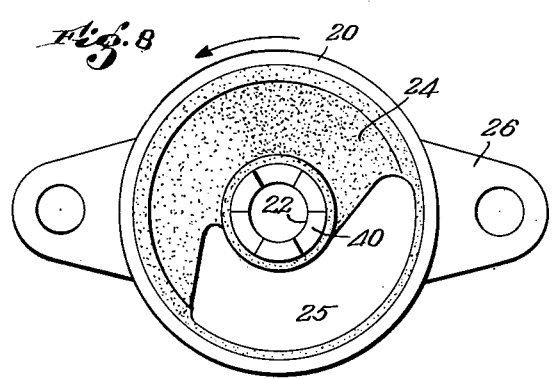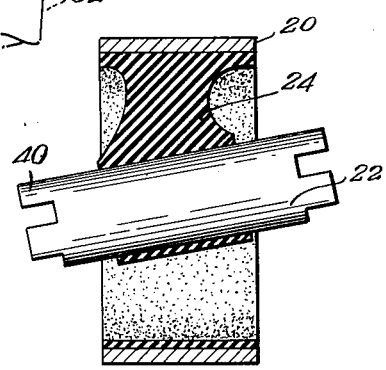

Patented Oct. 23, 1951

2,572,145

UNITED STATES PATENT OFFICE 2,572,145

CUSHIONED AND HINGED SEAT STRUCTURE

Severin B. Hendrickson, Templeton, Mass., assignor to Heywood-Wakefield Company, Gardner, Mass., a corporation of Massachusetts Application July 31, 1948, Serial No. 41,768

5 Claims. (Cl. 155—85)

This invention comprises a new and improved cushioned and hinged seat of the type particularly adapted for theatre seating and is characterized by a novel hinge structure in which is employed a pair of resilient bodies of rubber or the like constructed and arranged for tilting an unoccupied seat to a substantially vertical position by torsional action.

An object of this invention is to provide a hinge structure which is inexpensive to manufacture and to maintain, which is silent in operation, and which when used in chairs in theatres and the like will automatically swing the chair seat to a substantially vertical, out-of-the-way position when the seat is not in use.

Although hinges of rubber or like resilient material have been used in theatre seats in the past, they have not proved entirely successful. A difficulty encountered in using known types of rubber hinges is that their relatively solid structure has not allowed the rotating elements to move freely through more than a strictly limited arc. As a corollary such hinges are short-lived because of the strain induced by their short range of free movement.

One feature of my invention accordingly is a substantially cylindrical body of resilient material so shaped as to provide an open space which increases torsional resiliency. In one embodiment of the invention the resilient portion is in the form of a semi-cylindrical segment radially affixed between a shaft and an enclosing metal sleeve. As the sleeve is relatively rotated with respect to the shaft this segment will stretch and permit a greater freedom of motion than possible with the solid body of rubber. A seat having the structure of my invention operates without the stiffness inherent in the solid rubber hinge, thus contributing to the occupant's comfort.

Going more into detail, the resilient body is herein shown as circumferentially complete and as having complete circumferential bonds both with an enclosing cylindrical sleeve and to an inner concentric shaft. By this construction danger of separation of the parts is minimized and assembly facilitated. The bond is still further safeguarded by reducing the interior cross section of the rubber body thus concentrating the strains of torsional flexing in a location remote from the bonded surfaces. The same construction presents the additional advantage of permitting compensating adjustment of the parts in case of irregularities in floor level or faulty location of the main supports of the seat.

These and other advantages of the invention will be more readily understood and appreciated from the following description of a preferred embodiment thereof, selected for purposes of illustration and shown in the accompanying drawings, in which.

Fig. 1 is a front view of a theatre seat incorporating a hinge constructed according to my invention, Fig. 2 is a view in side elevation of the theatre seat showing the upright tilted position automatically assumed by the seat when not in use, the seat and back being shown in cross section.

Fig. 3 is a side view of the hinge and a portion of the attached chair frame, the chair being unoccupied and the hinge in normal position.

Fig. 4 is a plan view of the hinge and a portion of the associated seat frame,

Fig. 5 is a side view of the hinge and a portion of the seat frame when the seat is in an occupied or horizontal position and the resilient portion of the hinge is under torsional tension, Fig. 6 is a side view of the hinge in normal untwisted position, Fig. 7 is a view in cross-section of the hinge, Fig. 8 is a side view of the hinge showing the elements rotated so as to twist the resilient segment, and presenting a configuration similar to that when the seat is occupied.

Fig. 9 is a view in cross-section of the hinge showing the shaft tilted with respect to the cylindrical band, illustrating capacity of the hinge for compensation for misalignment.

Fig. 1 and Fig. 2 illustrate a theatre chair of conventional design incorporating the hinge of my invention. The chair comprises a pair of vertical standards 10 having arm rests 12, a conventional upholstered seat 14 with a seat bottom 16, and a conventional back rest 18. Both Figs. 1 and 2 show the seat 14 in tilted, upright position where, as will presently appear, it is normally held by the hinge of my invention when the chair is not in use. When the seat is occupied it assumes the horizontal position shown in Fig. 2 by the dotted lines 19.

Although the hinge connecting the support 10 with the seat 14 may be seen in Figs. 1 and 2, its construction will be more clearly understood by reference to Figs. 3, 4 and 5, where the left hinge of the seat 14 in Fig. 1 is shown in detail. The connection comprises three main elements: a cylindrical metal sleeve 20, a hollow shaft 22 concentrically positioned within the sleeve and radially spaced from it, and a body of resilient material such as rubber forming a solid semi-cylindrical segment or bushing 24 in the annular region between the sleeve 20 and the shaft 22. The rubber segment 24 is secured, for example by vulcanizing, to both the sleeve and the shaft, leaving a segmental annular space 25 approximately 120° in length. Viewed in cross-section as in Figs. 7 and 9 the rubber segment 24 comprises outer and inner flange sections joined by a central web of reduced thickness. This construction enables the torsional flexing to be concentrated in the central portion of the rubber segment instead of at the inner or outer faces where there would be a risk of breaking away the resilient material from the enclosing sleeve 20 or the shaft 22.

The sleeve 20 is provided with a pair of oppositely disposed radial ears 26, which may be either integral with the inner end of the sleeve or welded thereto. By means of these ears 26 and rivets 28 the sleeves 20 are secured to the frame 30 on opposite sides of the seat 14, at points about three quarters of the way from front to back of the seat.

The shaft 22 of each hinge is rigidly connected at its outer end to the chair standard 10 by means of a short tapered arm 32 which slides into a conically recessed bracket 34 affixed to a standard 10. The arm 32 is flattened at its upper end to form a circular hub section 36 having three radially disposed slots 38. The slots 38 engage corresponding longitudinal projections 40 on the end of the shaft 22 (Figs. 7 and 9) as the arm 32 is connected with the shaft 22. A bolt 42 passing through the center of the hub 36 and extending through the central bore of the shaft 22, serves to secure the arm 32 to the shaft 22. In similar way the bolt 42 also secures a cam 44 to the opposite end of the shaft 22. When the seat 14 is rocked to a horizontal position of use (Fig. 5) the cam 44 makes contact with a flat stop 46 which is affixed to the frame 30, and the seat 14 is thus prevented from rotating past the horizontal position.

The resilient body of which each segment 24 is formed is circumferentially complete and is bonded continuously to the entire inner wall of one of the sleeves 20. It is provided with an internal recess 25 forming a segmental open space which is located beneath one of the shafts 22 when the seat is in its horizontal or occupied position.

The operation of the hinge will readily be understood by reference to the attached drawings. Figs. 3 and 6 show the rubber segment 24 under no stress, the condition prevailing when the seat 14 is in upright, unoccupied position as shown by the solid lines in Fig. 2. As an occupant seats himself, rotating the seat 14 downward in a counterclockwise direction to the approximately horizontal position of broken lines in Fig. 2, stop 46 engages the cam 44 (Fig. 5) and the seat is stopped in a position of use. As the seat is rotated to horizontal the annular sleeve 20, affixed to the seat, moves counterclockwise relative to the shaft 22 affixed to the chair standard 10. As a result of this relative motion the rubber segment 14 is torsionally twisted and stretched as shown in Figs. 5 and 8. The range and resiliency demonstrated by the rubber segment during this operation is attributable in large part to the utilization of the annular space 25 and the central web of reduced thickness which greatly enhances these qualities over a hinge employing solid rubber.

It will be noted that as the seat 14 is occupied (Fig. 5) the weight of the occupant is transmitted to the top of the sleeve 20 where it is applied through the rubber segment 24 to the shaft 22 and thence to the standards 10. The segment is therefore compressed by this weight, developing no tendency to tear away from either the sleeve 20 or the shaft 22 to each of which it is affixed, as would be the case were the mounting arrangement inverted. Instead of compressing the rubber segment 24, the weight of the occupant would then severely stretch it between the shaft above and the wall of the sleeve below.

When the occupant of the seat 14 rises the energy stored in the twisted rubber segment 24 causes the sleeve 20 and the associated seat 14 to rotate in a clockwise direction relative to the shaft 22 and the associated standard 10 until the upright forwardly inclined position of the seat is reached at which point the rubber segment assumes its normal condition of no stress (Fig. 3). No stop is necessary to prevent continued rotation in a clockwise direction because such continued rotation of the seat 14 does no harm, merely bringing the seat into contact finally with the back 16. In this case the rubber segment 14 is twisted in opposite fashion and it immediately seeks to restore the seat to normal position. As a matter of fact, where the occupant rises to permit another person to pass it will be convenient to rotate the seat 14 backward from its normal upright position to afford more room momentarily.

The capacity of the hinge to accommodate itself to misalignment, such as may be caused by an uneven floor surface or by structural discrepancies in the components of the chairs, is illustrated in Figs. 7 and 9. The cross-section there shown of the rubber segment 24 indicates how the relatively narrow central portion lends flexibility for movement out of axial alignment of the shaft 22 relative to the sleeve 20. The hinge will function in spite of lack of alignment and, referring to the front view of a theatre seat in Fig. 1, it will be seen that the seat 14 will operate in spite of the fact that one of the standards 10 may not be exactly at right angles to the hinge axis or that the standards may not be parallel with one another.

While the above description has been limited chiefly to the application of the hinge to theatre chairs, those skilled in the art will appreciate the value of the invention in numerous other applications.

Having thus disclosed my invention and described in detail a preferred embodiment thereof, I claim as new and desire to secure by Letters Patent:

1. A cushioned and hinged seat structure composed of spaced standards, an interposed seat, and connections between the standards and seat including aligned sleeves secured to opposite sides of the seat, a concentric shaft secured to each standard, and a cylindrical resilient body secured to the surface of each shaft and the inner surface of each sleeve and having a substantially segmental open recess therein located within each sleeve and beneath its shaft, thereby cushioning the seat while occupied, and being initially free of torsional stress when the seat is in elevated position thereby tending to restore it to such position when unoccupied.

2. A cushioned and hinged seat as described in claim 1 wherein each cylindrical resilient body has a central web of reduced thickness tending to concentrate torsional flexing in the web area.

3. A cushioned and hinged seat as described in claim 1 wherein each of the cylindrical resilient bodies is circumferentially complete and has a segmental internal recess in its lower portion.

4. A cushioned and hinged seat structure comprising spaced supports each carrying a fixed horizontally disposed shaft, a seat having a pair of cylindrical sleeves concentrically disposed with respect to said shafts, and in each sleeve a rubber body being formed with surfaces bonded continuously to the inner wall of the sleeve and to the surface of the shaft, said rubber body being reduced in cross section midway between said shaft and said sleeve to concentrate torsional flexing in an area remote from said bonded surfaces and having a segmental recess in its lower side approximately 120° in length.

5. A hinge for pivotally connecting a chair seat to a lateral support comprising, a sleeve, a shaft within the sleeve, a resilient bushing inter-connecting the shaft and the sleeve, said bushing having outer and inner flanges being firmly bonded to the shaft and the sleeve over a wide area of each and having a web of reduced thickness therebetween, walls in said bushing on one side of the shaft defining an open space extending axially of the shaft and sleeve, whereby the shaft may be adapted to bear the weight of the chair seat when the seat is in substantially vertical position and said bushing is in the normal relaxed state, and whereby there is a relative rotational movement between the sleeve and the shaft when the seat is depressed to sitting position, flexing said bushing with the shaft bearing against the inner flange and the inner flange bearing against said web portion of said bushing.

SEVERIN B. HENDRICKSON.

REFERENCES CITED

The following references are of record in the file of this patent:

UNITED STATES PATENTS

| Number | Name | Date |
| --- | --- | --- |
| 1,973,178 | Sass | Sept. 11, 1934 |
| 2,178,077 | Loftis | Oct. 31, 1939 |
| 2,272,298 | Hanson | Feb. 10, 1942 |
| 2,280,298 | Nordmark | Apr. 21, 1942 |
| 2,393,141 | Butterfield | Jan. 15, 1946 |